May 25, 1937.  B. McINTOSH  2,081,594
CASTER BRAKE
Filed June 5, 1936
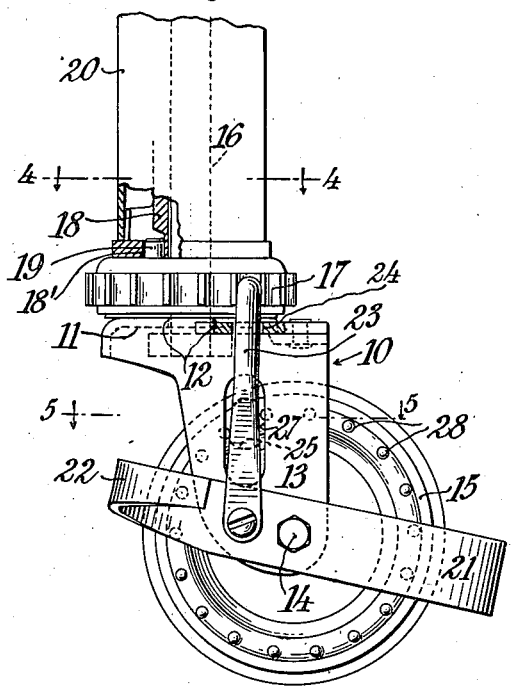
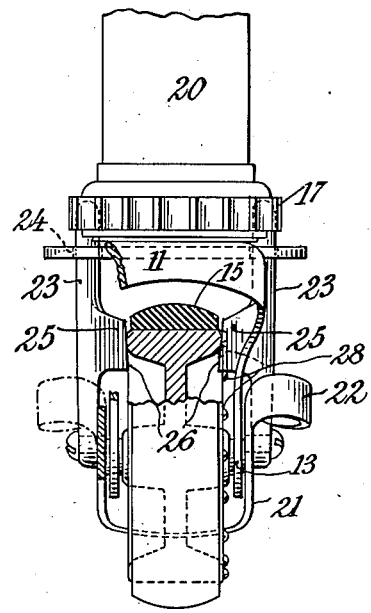
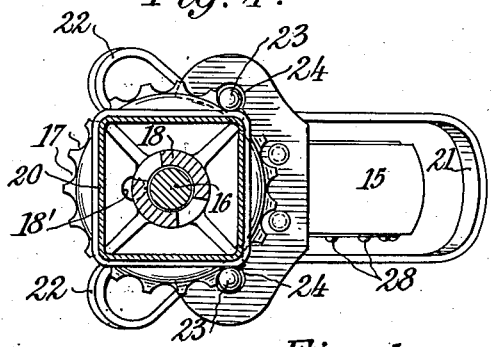
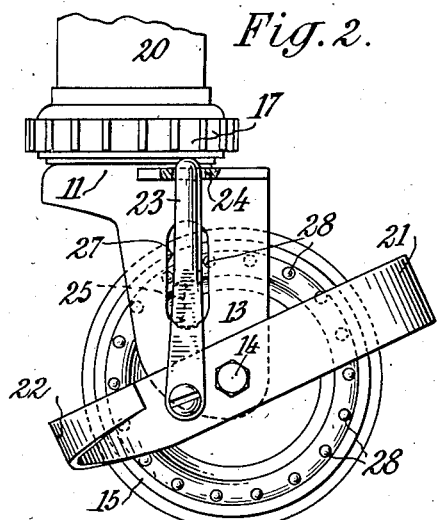
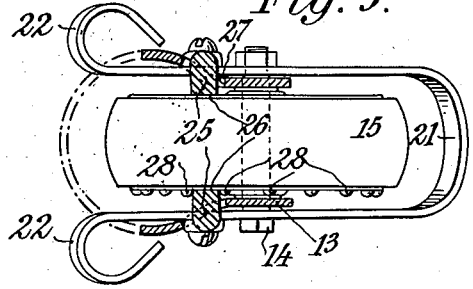
INVENTOR
Burtnett McIntosh,
BY
Fraser, Myers & Manley
ATTORNEYS.

Patented May 25, 1937

2,081,594

UNITED STATES PATENT OFFICE 2,081,594

CASTER BRAKE

Burtnett McIntosh, Floral Park, N. Y., assignor to Frank A. Hall & Sons, New York, N. Y.

Application June 5, 1936, Serial No. 83,635

9 Claims. (Cl. 16—35)

My present invention relates to casters, and aims to provide certain improvements therein. More particularly it relates to casters for hospital beds, operating tables, portable machines of various kinds, merchandise trucks and the like, in which the caster wheels are freely rotatable about their horizontal axes and the casters as a whole are rotatable about their journaled vertical axes, and wherein at times it is desirable to have said devices remain in a set stationary position. My invention is accordingly specifically directed to means for braking the caster wheel against rotation and for simultaneously locking the caster against relative movement with respect to the device to which it is attached when said device has been set in a desired position.

A caster capable of performing the foregoing functions is disclosed in my prior Patent No. 1,671,774, dated May 29, 1928, and although casters made in accordance with the disclosure of said patent have proved satisfactory, my present invention has for its primary objects the simplification and cheapening of the production costs of such devices. A further object is to provide a braking device in a caster which will not operate upon the rubber tread thereof but rather against the sides or inner periphery of the caster wheel rim.

The invention will be better understood from the detailed description which follows, when considered in conjunction with the accompanying drawing, wherein:—

Figure 1 is a side elevation of a caster embodying my invention with the parts in locking and braking relation, parts thereof being broken away to better show certain details of construction.

Fig. 2 is a view similar to Fig. 1, with the parts in unlocked and unbraked position.

Fig. 3 is a front elevation of the caster shown in Fig. 1, as viewed from the left thereof.

Fig. 4 is a section taken substantially along the plane of the line 3—3 of Fig. 1.

Fig. 5 is a section taken substantially along the plane of the line 5—5 of Fig. 1.

Referring to the drawing wherein similar reference characters are employed to designate the corresponding parts in the several figures, let the numeral 10 indicate a caster horn of conventional configuration having a flat top 11 with an opening 12 therein and a pair of downwardly-extending ears 13, which, adjacent their free ends, support a shaft 14 upon which is mounted a caster wheel 15.

Extending upwardly through the opening 12 in the top of the horn is a bolt or pintle 16 about the axis of which the horn is freely rotatable. Also mounted upon said bolt so as to be freely rotatable with respect thereto is a locking plate 17, herein shown as a peripherally toothed wheel. The plate 17 may house an anti-friction means (not shown) to permit free rotation of the horn 10 about the pintle 16 relatively to the locking plate. Mounted on the locking plate so as to be rotatable therewith as a unit is an expansion adapter 18, the base of which has an opening 18' therein eccentrically disposed with respect to the axis of the adapter, and extending into said opening is an upstanding pin 19 carried by the locking plate. The adapter 18 is designed to be expanded within a tubular member 20 which may be the foot of a hospital bed or other article of furniture or the like, so that the caster as a whole will be held therein against accidental withdrawal. The specific form of the expansion adapter employed in conjunction with the caster herein disclosed constitutes the subject-matter of my co-pending application, Serial No. 83,636, filed of even date herewith.

Pivotally mounted on the caster wheel shaft 14 is a yoke-shaped operating lever 21 which straddles the caster wheel 15 and preferably extends beyond the periphery of said caster wheel at diametrically opposite points. The free ends of the operating lever 21 are turned outwardly back upon themselves, as indicated at 22, to provide bearing surfaces for engagement by the shoe of an operator for moving said lever to operate a locking means and a braking means presently to be described.

Pivotally carried by the operating lever 21, preferably at a point spaced from the pivotal connection with the shaft 14 on each arm of the yoke is an upstanding pin 23 which projects through a guide opening 24 in the top of the horn and adapted to engage between adjacent teeth on the locking plate 17 when the bight end of the operating lever 21 is moved downwardly. By this action the horn or caster as a whole will be locked against relative rotation with respect to the locking plate inasmuch as the locking plate is held against relative rotation with respect to the hollow leg 20.

For braking the caster wheel against rotation about its axis I have provided a pair of lugs 25 having cam surfaces 26 adapted to engage the wheel of the caster inwardly of the tread thereof and preferably at the side of the rim of said wheel. As herein shown the lugs 25 are integrally formed on the pins 23 and are guided in their movements into and out of braking engagement with the wheel by extending through vertical slots 27 in the arms 13 of the horn. The lugs 25 being carried by the pins 23 they will move therewith as a unit as said pins are moved into and out of locking engagement with the locking plate 17 by the operating lever 21. Thus it will be seen that the caster as a whole may be locked against relative rotation with respect to the tubular member 20 and the wheel thereof simultaneously braked against rotation. To further insure against rotation of the caster wheel upon the braking thereof I prefer to form either one or both sides of the rim adjacent the periphery thereof with protuberances 28 circumferentially spaced equally around said rim a distance apart substantially equal to the width of the lug 25 which is adapted to engage between adjacent protuberances.

Although from the foregoing detailed description the construction and operation of my improved caster should be apparent, a few additional remarks by way of recapitulation will not be out of order. The caster wheel as a unit is mounted in the hollow leg member 20 by having the expansion adapter 18 expanded into clamping engagement with the inner wall of said hollow leg. In the normal position of the caster as shown in Fig. 2, the locking pins 23 and the braking lugs 25 are out of engagement with the locking plate 17 and the rim of the wheel 15 respectively, and the caster as a whole is free to rotate about its pintle axis 16 relatively to the hollow leg 20 and the wheel 15 is free to rotate about its shaft. When it is desired to lock the caster against rotation about its vertical axis and hold the wheel against rotation about its horizontal axis, it is merely necessary to apply downward pressure with the foot or other device upon the bight end of the operating lever 21 to bring the parts into the relationship shown in Fig. 1. When such movement is imparted to the operating lever, the pins 23 will be moved upwardly and guided in their movement through the openings 24 to engage between teeth on the locking plate 17 to hold the caster and locking plate against relative rotation and simultaneously with such movement the cam faces 26 of the lugs 25 will engage the inner rim of the wheel 15 to brake the wheel against rotation about its axis. The wheel will also be locked against rotation by engagement of a lug between two adjacent protuberances 28. To disengage the locking and braking means it is merely necessary to press downwardly upon the ends 22 of the operating lever. The downward movement of the operating lever is limited by engagement of the lugs with the bottom of the slots 27, thereby preventing disengagement of the pins from the guide openings 24 and insuring a maintenance of the parts in operative relation for locking and braking, when again desired.

From the foregoing detailed description it will be apparent that I have provided a simple and efficient locking and braking means for a caster, and while I have shown and described but a single embodiment of my invention it is to be understood that I do not wish to be limited to the specific means disclosed, as it will be understood that the same may be modified within the range of mechanical skill without departing from the spirit of my invention as claimed.

What I claim is:

1. In a caster wheel, in combination, a stem, a horn, a caster wheel mounted on a shaft carried by the horn, braking means comprising a pair of pins having cam surfaces movable to engage the opposite faces of the caster wheel rim inwardly of the tread thereof, and an operating lever for moving said pins into and out of braking engagement with the caster wheel.

2. In a caster wheel, in combination, a stem, a horn, a caster wheel mounted on a shaft carried by the horn, braking means comprising a lug movable to engage a side of the caster wheel rim inwardly of the tread thereof, and an operating lever for moving said lug into and out of braking engagement with the caster wheel, said braking means being carried by the operating lever and the horn having an opening therein for guiding the braking lug.

3. In a caster wheel, in combination, a stem, a horn, a caster wheel mounted on a shaft carried by the horn, braking means comprising a pair of pins having cam surfaces movable to engage the opposite sides of the caster wheel rim inwardly of the tread thereof, an operating lever pivotally mounted with respect to the horn for moving said pins into and out of braking engagement with the caster wheel, said braking means being carried by the operating lever and the horn having openings therein for guiding the braking pins and for limiting the position of the operating lever upon disengagement of the braking means.

4. In a caster, in combination, a stem, a horn freely rotatable about the axis of the stem, a recessed locking plate rotatable with the stem, a caster wheel mounted on a shaft carried by the horn, movable locking means extending through a guide opening in the horn for engaging in a recess in the locking plate to lock the horn against relative rotation with respect to the stem, braking means for engaging the caster wheel to prevent rotation thereof, and an operating lever pivotally mounted with respect to the horn for moving the locking means and the braking means into and out of locking engagement and braking relation with the locking plate and the caster wheel respectively, the locking and braking means being mounted on a single element carried by the operating lever.

5. In a caster, in combination, a stem, a horn freely rotatable about the axis of the stem, a recessed locking plate rotatable with the stem, a caster wheel mounted on a shaft carried by the horn, movable locking means extending through a guide opening in the horn for engaging in a recess in the locking plate to lock the horn against relative rotation with respect to the stem, braking means comprising a projection on the locking means for engaging the caster wheel inwardly of the tread thereof to prevent rotation thereof, and an operating lever pivotally mounted with respect to the horn for moving the locking means and the braking means into and out of locking engagement and braking relation with the locking plate and the caster wheel respectively.

6. In a caster, in combination, a stem, a horn freely rotatable about the axis of the stem, a recessed locking plate rotatable with the stem, a caster wheel mounted on a shaft carried by the horn, movable locking means extending through a guide opening in the horn for engaging in a recess in the locking plate to lock the horn against relative rotation with respect to the stem, braking means for engaging the caster wheel to prevent rotation thereof, and an operating lever pivotally mounted coaxially with the shaft of the caster wheel for moving the locking means and the braking means into and out of locking engagement and braking relation with the locking plate and the caster wheel respectively, the locking and braking means being mounted on a single element carried by the operating lever.

7. In a caster, in combination, a stem, a horn, a caster wheel mounted on a shaft carried by the horn, braking means comprising a guided pin having a camming surface for engaging a side of the rim of the caster wheel inwardly of the tread thereof, and a pedal operating lever pivotally mounted with respect to the horn controlling the braking means.

8. In a caster, in combination, a stem, a horn, a caster wheel having protuberances at one side thereof circumferentially spaced therearound mounted on a shaft carried by the horn, braking means comprising a guided pin for engaging the side of the wheel rim between two spaced protuberances, and a pedal operating lever pivotally mounted with respect to the horn for controlling the braking means.

9. In a caster, in combination, a stem, a horn, a caster wheel having protuberances at one side thereof circumferentially spaced therearound mounted on a shaft carried by the horn, braking means comprising a guided pin having a camming surface for engaging the side of the wheel rim between two spaced protuberances, and a pedal operating lever pivotally mounted with respect to the horn for controlling the braking means.

BURTNETT McINTOSH.